(12) United States Patent
Zhuang et al.

(10) Patent No.: US 12,488,005 B1
(45) Date of Patent: Dec. 2, 2025

(54) QUERY TO INTEREST MAPPING

(71) Applicant: Pinterest, Inc., San Francisco, CA (US)

(72) Inventors: Jinfeng Zhuang, Sammamish, WA (US); Jinyu Xie, San Mateo, CA (US); Yunsong Guo, Santa Clara, CA (US)

(73) Assignee: Pinterest, Inc., San Francisco, CA (US)

( * ) Notice: Subject to any disclaimer, the term of this patent is extended or adjusted under 35 U.S.C. 154(b) by 867 days.

(21) Appl. No.: 16/732,119

(22) Filed: Dec. 31, 2019

Related U.S. Application Data

(60) Provisional application No. 62/909,134, filed on Oct. 1, 2019.

(51) Int. Cl.
| | | |
|---|---|---|
| *G06F 16/00* | (2019.01) | |
| *G06F 16/242* | (2019.01) | |
| *G06F 16/2457* | (2019.01) | |
| *G06F 16/248* | (2019.01) | |
| *G06F 16/28* | (2019.01) | |
| *G06N 20/00* | (2019.01) | |

(52) U.S. Cl.
CPC ...... *G06F 16/2457* (2019.01); *G06F 16/2423* (2019.01); *G06F 16/248* (2019.01); *G06F 16/285* (2019.01); *G06N 20/00* (2019.01)

(58) Field of Classification Search
CPC ............... G06F 16/2457; G06F 16/248; G06F 16/2423; G06F 16/285; G06N 20/00
USPC ................................................. 707/600–899
See application file for complete search history.

(56) References Cited

U.S. PATENT DOCUMENTS

| | | | | |
|---|---|---|---|---|
| 9,015,185 | B2 * | 4/2015 | Kanigsberg | G06Q 30/0269 707/765 |
| 9,767,204 | B1 * | 9/2017 | Hoover | G06F 16/9535 |
| 2008/0250011 | A1 * | 10/2008 | Haubold | G06F 16/43 707/999.005 |
| 2015/0178392 | A1 * | 6/2015 | Jockisch | G06F 16/9535 707/706 |
| 2020/0302331 | A1 * | 9/2020 | Lonij | G06N 20/00 |

OTHER PUBLICATIONS

Bojanowski, P. et al., 2017, Enriching Word Vectors with Subword Information. TACL 5 (2017), pp. 135-146, Retrieved: https://www.mitpressjournals.org/doi/pdfplus/10.1162/tacl_a_00051, 13 pages.

(Continued)

*Primary Examiner* — Charles Rones
*Assistant Examiner* — Shirley D Hicks
(74) *Attorney, Agent, or Firm* — Athorus, PLLC

(57) ABSTRACT

Systems and methods for identifying relevant content within a corpus of visual content items in response to a user's text-based query are presented. In response to a text-based query, the query is mapped to a most-engaged content item of the corpus of visual content items included in responses to the query from a plurality of users. At least one text-based term associated with the most-engaged content item is identified and combined with the query from an expanded query. The expanded query is mapped to an interest node of an interest taxonomy and content items associated with the mapped interest node are identified. At least some of the content items associated with the mapped interest node are selected and returned as response content to the received query.

20 Claims, 9 Drawing Sheets

(56) References Cited

OTHER PUBLICATIONS

Cer, D. et al., 2018, Universal Sentence Encoder. CoRR abs/1803.11175 (2018), arXiv:1803.11175, Retrieved: https://arxiv.org/pdf/1803.11175.pdf, 7 pages.

Chen, T. and Guestrin, C. 2016. XGBoost: A Scalable Tree Boosting System. In Proceedings of the 22nd ACM SIGKDD International Conference on Knowledge Discovery and Data Mining, San Francisco, CA, USA, Aug. 13-17, 2016, pp. 785-794, Retrieved: https://doi.org/10.1145/2939672.2939785, 10 pages.

Cho, K. et al., 2014, Learning Phrase Representations Using RNN Encoder-Decoder for Statistical Machine Translation. In Proceedings of the 2014 Conference on Empirical Methods in Natural Language Processing, EMNLP 2014, Oct. 25-29, 2014, Doha, Qatar, A meeting of SIGDAT, a Special Interest Group of the ACL, pp. 1724-1734, Retrieved: http://emnlp2014.org/papers/pdf/EMNLP2014179.pdf, 11 pages.

Conneau, A. et al., 2017, Very Deep Convolutional Networks for Text Classification. In Proceedings of the 15th Conference of the European Chapter of the Association for Computational Linguistics, EACL 2017, Valencia, Spain, Apr. 3-7, 2017, vol. 1: Long Papers, pp. 1107-1116, Retrieved: https://loicbarrault.github.io/papers/conneau_eacl2017.pdf, 10 pages.

Cortes, C. and Vapnik, V., 1995, Support-Vector Networks. Machine Learning 20, 3 (1995), pp. 273-297, Retrieved: http://image.diku.dk/imagecanon/material/cortes_vapnik95.pdf, 25 pages.

Dai, Z. et al., 2019, Transformer-XL: Attentive Language Models Beyond a Fixed-Length Context. In Proceedings of the 57th Conference of the Association for Computational Linguistics, ACL 2019, Florence, Italy, Jul. 28-Aug. 2, 2019, vol. 1: Long Papers, pp. 2978-2988, Retrieved: https://www.aclweb.org/anthology/P19-1285.pdf, 11 pages.

Devlin, J. et al., 2018, BERT: Pre-training of Deep Bidirectional Transformers for Language Understanding. CoRR abs/1810.04805 (2018), arXiv:1810.04805, Retrieved: https://arxiv.org/pdf/1810.04805v1.pdf, 14 pages.

Ganti, V. et al., 2010, Precomputing Search Features for Fast and Accurate Query Classification. In Proceedings of the Third International Conference on Web Search and Web Data Mining, WSDM 2010, New York, Ny, USA, Feb. 4-6, 2010, Retrieved: https://www.microsoft.com/en-us/research/wp-content/uploads/2016/02/WDSM67-konig.pdf, 10 pages.

Hochreiter, S. and Schmidhuber, J., 1997. Long Short-Term Memory. Neural Computation 9, 8 (1997), pp. 1735-1780, Retrieved: http://www.bioinf.jku.at/publications/older/2604.pdf, 32 pages.

Howard, J. and Ruder, S., 2018, Universal Language Model Fine-tuning for Text Classification. In Proceedings of the 56th Annual Meeting of the Association for Computational Linguistics, ACL 2018, Melbourne, Australia, Jul. 15-20, 2018, vol. 1: Long Papers, pp. 328-339, Retrieved: https://arxiv.org/pdf/1801.06146.pdf, 12 pages.

Jansen, B. J. et al., 2008, Determining the Informational, Navigational, and Transactional Intent of Web Queries. Inf. Process. Manage. 44, 3 (2008), pp. 1251-1266, Retrieved: https://faculty.ist.psu.edu/jansen/academic/pubs/jansen_user_intent.pdf, 16 pages.

Joulin, A. et al., 2017, Bag of Tricks for Efficient Text Classification. In Proceedings of the 15th Conference of the European Chapter of the Association for Computational Linguistics, EACL 2017, Valencia, Spain, Apr. 3-7, 2017, vol. 2: Short Papers, pp. 427-431, Retrieved: https://www.aclweb.org/anthology/E17-2068.pdf, 5 pages.

Kim, Y., 2014, Convolutional Neural Networks for Sentence Classification. In Proceedings of the 2014 Conference on Empirical Methods in Natural Language Processing, pp. 1746-1751, Retrieved: http://emnlp2014.org/papers/pdf/EMNLP2014181.pdf, 6 pages.

Kingma, D. P. and Ba, J., 2015, Adam: A Method for Stochastic Optimization. In 3rd International Conference on Learning Representations, ICLR 2015, San Diego, CA, USA, May 7-9, 2015, Conference Track Proceedings. http://arxiv.org/abs/1412.6980, Retrieved: https://arxiv.org/pdf/1412.6980.pdf, 15 pages.

Kumar, A. et al., 2016, Ask Me Anything: Dynamic Memory Networks for Natural Language Processing. In Proceedings of the 33nd International Conference on Machine Learning, ICML 2016, New York City, NY, USA, Jun. 19-24, 2016, pp. 1378-1387, Retrieved: https://arxiv.org/pdf/1506.07285.pdf, 10 pages.

Laclavik, M. et al., 2015, Search Query Categorization at Scale. In Proceedings of the 24th International Conference on World Wide Web Companion, WWW 2015, Florence, Italy, May 18-22, 2015—Companion Volume pp. 1281-1286, https://doi.org/10.1145/2740908.2741995, Retrieved: http://www.www2015.it/documents/proceedings/companion/p1281.pdf, 6 pages.

Lai, S. et al., 2015, Recurrent Convolutional Neural Networks for Text Classification, In Proceedings of the Twenty-Ninth AAAI Conference on Artificial Intelligence, Jan. 25-30, 2015, Austin, Texas, USA, pp. 2267-2273, Retrieved: https://pdfs.semanticscholar.org/eba3/6ac75bf22edf9a1bfd33244d459c75b98305.pdf, 7 pages.

Liu, X. et al., 2019, Multi-Task Deep Neural Networks for Natural Language Understanding. In Proceedings of the 57th Conference of the Association for Computational Linguistics, ACL 2019, Florence, Italy, July 28-Aug. 2, 2019, vol. 1: Long Papers, pp. 4487-4496, Retrieved: https://arxiv.org/pdf/1901.11504.pdf, 10 pages.

Liu, Y. et al., 2019, ROBERTa: A Robustly Optimized BERT Pretraining Approach. CoRR abs/1907.11692 (2019). arXiv:1907.11692 http://arxiv.org/abs/1907.11692, Retrieved: https://arxiv.org/pdf/1907.11692.pdf, 13 pages.

Mikolov, T. et al., 2013, Efficient Estimation of Word Representations in Vector Space. CoRR abs/1301.3781 (2013), arXiv:1301.3781 http://arxiv.org/abs/1301.3781, Retrieved: https://arxiv.org/pdf/1301.3781.pdf.

Palangi, H., 2016, Deep Sentence Embedding Using Long Short-Term Memory Networks: Analysis and Application to Information Retrieval. IEEE/ACM Trans. Audio, Speech and Language Processing 24, 4 (2016), pp. 694-707, Retrieved: https://arxiv.org/pdf/1502.06922.pdf, 25 pages.

Peters, M. E. et al., 2018, Deep Contextualized Word Representations. In Proceedings of the 2018 Conference of the North American Chapter of the Association for Computational Linguistics: Human Language Technologies, NAACL-HLT 2018, New Orleans, Louisiana, USA, Jun. 1-6, 2018, vol. 1 (Long Papers), pp. 2227-2237, Retrieved: https://www.aclweb.org/anthology/N18-1202.pdf, 11 pages.

Radford, A. et al., 2018, Improving Language Understanding by Generative Pre-Training. In arxiv, Retrieved: https://s3-us-west-2.amazonaws.com/openai-assets/research-covers/language-unsupervised/language_understanding_paper.pdf, 12 pages.

Radford, A. et al., 2018, Language Models are Unsupervised Multitask Learners, (2018) Retrieved: https://d4mucfpksywv.cloudfront.net/better-language-models/language_models_are_unsupervised_multitask_learners.pdf, 24 pages.

Sanh, V. et al., 2019, Smaller, faster, cheaper, lighter: Introducing DistilBERT, a distilled version of BERT, Retrieved: https://medium.com/huggingface/distilbert-8cf3380435b5, 11 pages.

Speer, R. et al., 2017, ConceptNet 5.5: An Open Multilingual Graph of General Knowledge. In Proceedings of the Thirty-First AAAI Conference on Artificial Intelligence, Feb. 4-9, 2017, San Francisco, California, USA, pp. 4444-4451, Retrieved: https://arxiv.org/pdf/1612.03975.pdf, 9 pages.

Sriram, B. et al., 2010, Short Text Classification in Twitter To Improve Information Filtering. In Proceeding of the 33rd International ACM SIGIR Conference on Research and Development in Information Retrieval, SIGIR 2010, Geneva, Switzerland, Jul. 19-23, 2010, pp. 841-842, Retrieved: http://cs.bilkent.edu.tr/~hakan/publication/TweetClassification.pdf, 2 pages.

Sun, C. et al., 2019, How to Fine-Tune BERT for Text Classification? CoRR abs/1905.05583 (2019). arXiv: 1905.05583 http://arxiv.org/abs/1905.05583, Retrieved: https://arxiv.org/pdf/1905.05583.pdf, 10 pages.

Vaswani, A. et al., 2017, Attention is All you Need. In Annual Conference on Neural Information Processing Systems 2017, Dec. 4-9, 2017, Long Beach, Ca, USA, pp. 6000-6010, Retrieved: https://arxiv.org/pdf/1706.03762.pdf, 15 pages.

Vinicombe, H., 2019, Understanding Pins Through Key-Word Extraction, Retrieved: https://medium.com/pinterest-engineering/understanding-pins-through-keyword-extraction-40cf94214c18, 9 pages.

(56) References Cited

OTHER PUBLICATIONS

Wang, J. et al., 2017, Combining Knowledge with Deep Convolutional Neural Networks for Short Text Classification. In Proceedings of the Twenty-Sixth International Joint Conference on Artificial Intelligence, IJCAI 2017, Melbourne, Australia, Aug. 19-25, 2017, pp. 2915-2921, Retrieved: https://www.ijcai.org/proceedings/2017/0406.pdf, 7 pages.

Wang, Z. et al., 2015, Query Understanding through Knowledge-Based Conceptualization. In Proceedings of the Twenty-Fourth International Joint Conference on Artificial Intelligence, IJCAI 2015, Buenos Aires, Argentina, Jul. 25-31, 2015, pp. 3264-3270, Retrieved: http://idke.ruc.edu.cn/publications/2015/Query%20Understanding%20through%20Knowledge-Based%20Conceptualization.pdf, 7 pages.

Yang, Z. et al., 2016, Hierarchical Attention Networks for Document Classification. In NAACL HLT 2016, The 2016 Conference of the North American Chapter of the Association for Computational Linguistics: Human Language Technologies, San Diego California, USA, Jun. 12-17, 2016, pp. 1480-1489, Retrieved: https://www.cs.cmu.edu/~hovy/papers/16HLT-hierarchical-attention-networks.pdf, 10 pages.

Yang, Z. et al., 2019, XLNet: Generalized Autoregressive Pretraining for Language Understanding. CoRR abs/1906.08237 (2019), Retrieved: https://arxiv.org/pdf/1906.08237.pdf, 18 pages.

Zhai, Z. et al., 2019, Learning a Unified Embedding for Visual Search at Pinterest. In Proceedings of the 25th ACM SIGKDD International Conference on Knowledge Discovery & Data Mining, KDD 2019, Anchorage, AK, USA, Aug. 4-8, 2019, pp. 2412-2420. https://doi.org/10.1145/3292500.3330739, Retrieved: https://arxiv.org/pdf/1908.01707.pdf, 9 pages.

Zhang, Y. and Wallace, B. C., 2017, A Sensitivity Analysis of (and Practitioners' Guide to) Convolutional Neural Networks for Sentence Classification. In Proceedings of the Eighth International Joint Conference on Natural Language Processing, IJCNLP 2017, Taipei, Taiwan, Nov. 27-Dec. 1, 2017—vol. 1: Long Papers, pp. 253-263, Retrieved: https://www.aclweb.org/anthology/I17-1026.pdf, 11 pages.

Zhuang J. and Liu, Y., 2019, Pin Text: A Multitask Text Embedding System in Pinterest. In Proceedings of the 25th ACM SIGKDD International Conference on Knowledge Discovery & Data Mining, KDD 2019, Anchorage, AK, USA, Aug. 4-8, 2019, pp. 2653-2661. https://doi.org/10.1145/3292500.3330671, Retrieved: http://delivery.acm.org/10.1145/3340000/3330671/p2653-zhuang.pdf?ip=66.27.221.11&id=3330671&acc=OPENTOC&key=4D4702B0C3E38B35%2E4D4702B0C3E38B35%2E9F04A3A78F7D3B8D&_acm_=1574391185_ff0863ef617dfd26f42cble6184ff322, 9 pages.

\* cited by examiner

QUERY TO INTEREST MAPPING

CROSS-REFERENCE TO RELATED APPLICATIONS

This application claims priority to U.S. Patent Application No. 62/909,134, filed Oct. 1, 2019, the contents of which are incorporated by reference herein in their entirety.

BACKGROUND

There are many online services that host and maintain content for their users and subscribers. As these online services maintain so much user-supplied content, frequently these online services also provide a content discovery service that allows their users to "discover" or find items of content maintained by the services. This discovery process happens when a user submits a query, typically a text-based query, to the online service for related and/or relevant content. In response, the online service identifies content, from a corpus of content items that it maintains, that is viewed as being relevant and/or related to the query and returns that content to the requesting user.

The way these online services manage and maintain user-supplied content is important. Some of these online services primarily manage textual content, meaning that the online services maintain user-supplied content (also referred to as user posts) as text-based content while also permitting users to associate non-textual content (e.g., images, video, audio, etc.) with the text-based content. On the other hand, there are online services that primarily manage visual content, i.e., non-text-based content, such as images or videos, while allowing users to associate textual content with the visual content. For those online services that maintain textual content, processing a text-based query to identify related, text-based content is relatively straightforward. However, for those online services that maintain visual content, responding to a text-based query with visual content is not simple.

A typical text-based query from a user is quite brief, usually no more than three or four terms. In fact, users often submit single-term queries. For example, it is not uncommon for an online service to receive a query of "chicken" from a user. Based on the query and the context surrounding the requesting user, typical and/or common associations with the term "chicken," and other factors, the online service may determine that the requesting user is looking for chicken-based recipes. Or, the online service may determine that the user is looking for information or images relating to the farm animal, "chicken." Assuming the online service decides that the query intent of the text-based query is to locate recipes for preparing chicken-related meals, the online service identifies chicken-based recipes from its corpus of content items and returns those recipes to the user in response to the query.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
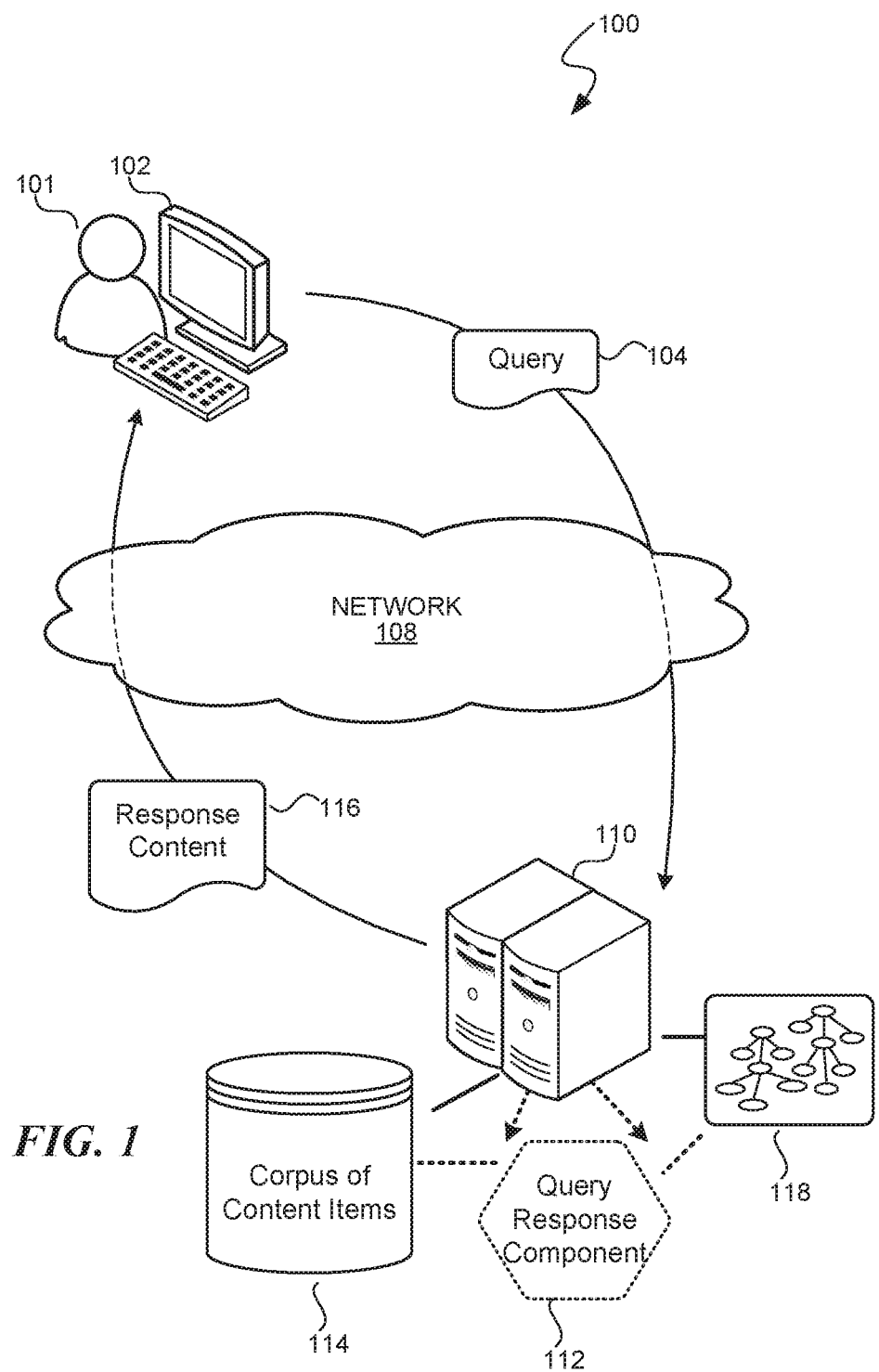
FIG. 1 is a pictorial diagram of an exemplary network environment suitable for implementing one or more aspects of the disclosed subject matter.

In accordance with various aspects and embodiments of the disclosed subject matter, systems and methods for identifying relevant content within a corpus of visual content items in response to a user's text-based query are presented. These methods and systems operate in the context of an online service that maintains a corpus of visual content items and can respond to a text-based query of a computer user (or, more simply, a "user") to identify relevant content to the query from the corpus of content items. Indeed, the online service maintains the corpus of content items as an arrangement of visual content items. The content items of this corpus are associated with one or more interest nodes of an interest taxonomy. According to aspects of the disclosed subject matter, each interest node is associated with or assigned a specific, distinct interest or topic. Regarding the content items of the corpus, in addition to being associated with one or more interest nodes of the interest taxonomy, the content items of the corpus may also be associated with textual content. The textual content associated with any given node may comprise any one or more of user annotations, a content title, captions associated with the content item, the content item's file name, a source path (e.g., a uniform resource locator or "URL", or uniform resource identifier or "URI") indicating an external source location of the content item, and the like. In response to a text-based query from a user, the online service determines one or more most-frequently identified content items included in a response to the text-based query from multiple users of the online service. From the most-frequently identified content items, the online service identifies at least one text-based term associated with the one or more most-frequently identified content items that is not a term of the received text-based query. The at least one text-based term is aggregated with the received text-based query to form an expanded query. A trained mapping model (a trained machine learning model) is then used to map the expanded query to one or more interest nodes of the interest taxonomy. Using the mapped one or more interest nodes of the interest taxonomy, one or more content items are selected. Typically, though not exclusively, these one or more content items from the corpus of content items are selected as being the most-engaged content items of the one or more mapped interest nodes. The online service then selects some of the content items (including selecting some content items having the highest relevance scores to the one or more mapped interest nodes) as content items to be included in a response to the received query.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" regarding multiple items should be viewed as meaning either or both items.

Turning to the figures, FIG. 1 is a block diagram illustrating an exemplary network environment 100 suitable for implementing one or more aspects of the disclosed subject matter. Indeed, FIG. 1 further illustrates the exemplary exchange of information between a computer user 101 and an online service 110 over a network 108, particularly in providing response content 116 to the computer user 101 in response the user's text-based query 104 via a user computing device 102.

By way of definition, the network 108 is a computer network, synonymously referred to as a data network. As those skilled in the art will appreciate, the computer network 108 is fundamentally a telecommunications network over which computers, computing devices such as user computing device 102, and other network-enabled devices and services, such as online service 110, can electronically communicate, including exchanging information and data. As those skilled in the art will appreciate, in computer network environments, such as network environment 100, networked computing devices are viewed as nodes on the network 108. Thus, in FIG. 1, computing device 102 and online service 110 are both viewed as network nodes.

In communicating with other devices over the network 108, connections between network nodes and the network comprise either cable media (electronic and/or optical connections based on physical structures such as wires or fibers), wireless media (wireless connections or transmissions between wireless transceivers), or a combination of both. While a well-known computer network is the Internet, the disclosed subject matter is not limited to the Internet. Indeed, elements of the disclosed subject matter may be suitably and satisfactorily implemented on a variety and combination of wide area networks, local area networks, enterprise networks, and the like.

As mentioned, the exemplary network environment 100 may include an online service 110. For purposes of this disclosure and by way of definition, an online service, such as online service 110, is a network-accessible service that typically provides one or more interfaces that enable users (such as computer user 101), devices, services, and/or processes to interact with the online service. Often, though not exclusively, these interfaces include one or more application programming interfaces (APIs) that allow programs and/or processes to interact with the online service, and/or one or more user interfaces by which the various users can interact (via user computers, such as computing device 102) with the online service. Social networking sites are non-limiting examples of online services, just as news organization sites and advertisement platforms are also non-limiting examples of online services.

As indicated in the exemplary network environment 100 of FIG. 1, the user 101, via the user's computing device 102, submits a query 104 to the online service 110 over the network 108. According to aspects of the disclosed subject matter, the user's query 104 is a text-based query that includes one or more text-based terms for which the online service 110 is to identify and return relevant content items from a corpus 114 of content items maintained by the service as response content 116. According to aspects of the disclosed subject matter, the online service 110 carries out a query response process 112 to identify the various content items of the response content 116 in response to the user's text-based query 104.

As will be discussed in greater detail below, and in accordance with aspects of the disclosed subject matter, as part of the query response process 112, the text-based query 104 is expanded and the resulting expanded query is mapped to one or more interest nodes of an interest taxonomy 118 maintained and/or accessible to the online service 110.

As those skilled in the art will appreciate, a taxonomy is an arrangement of a set of "things." Often, the taxonomy is arranged in a hierarchical manner. According to some aspects of the disclosed subject matter, the interest taxonomy 118 may be arranged in a hierarchical manner/arrangement. In the interest taxonomy 118 of the present case, these "things" or nodes within the taxonomy are interest nodes, sometimes called topic nodes. Elements of a taxonomy are typically, but not exclusively, located within a hierarchical organization based on shared or common characteristics, and names or labels are given to the nodes within the hierarchy.

Regarding the interest taxonomy 118, in a non-limiting embodiment, the interest taxonomy is a hierarchical arrangement of interest nodes, with each interest node corresponding to a specific, distinct interest or topic. Each interest node is associated with a name/label based on the interest or topic of the node. In the overall interest taxonomy, an interest node at a higher level (near the apex of the taxonomy) is more general than an interest node of a lower level, with "leaf" nodes being the most specific interest/topic. However, for purposes of the disclosed subject matter, the interest taxonomy need not be arranged in a hierarchical arrangement and could include cyclical connections. To further illustrate elements of an illustrative interest taxonomy, reference is now made to FIG. 2.

Figure 2:
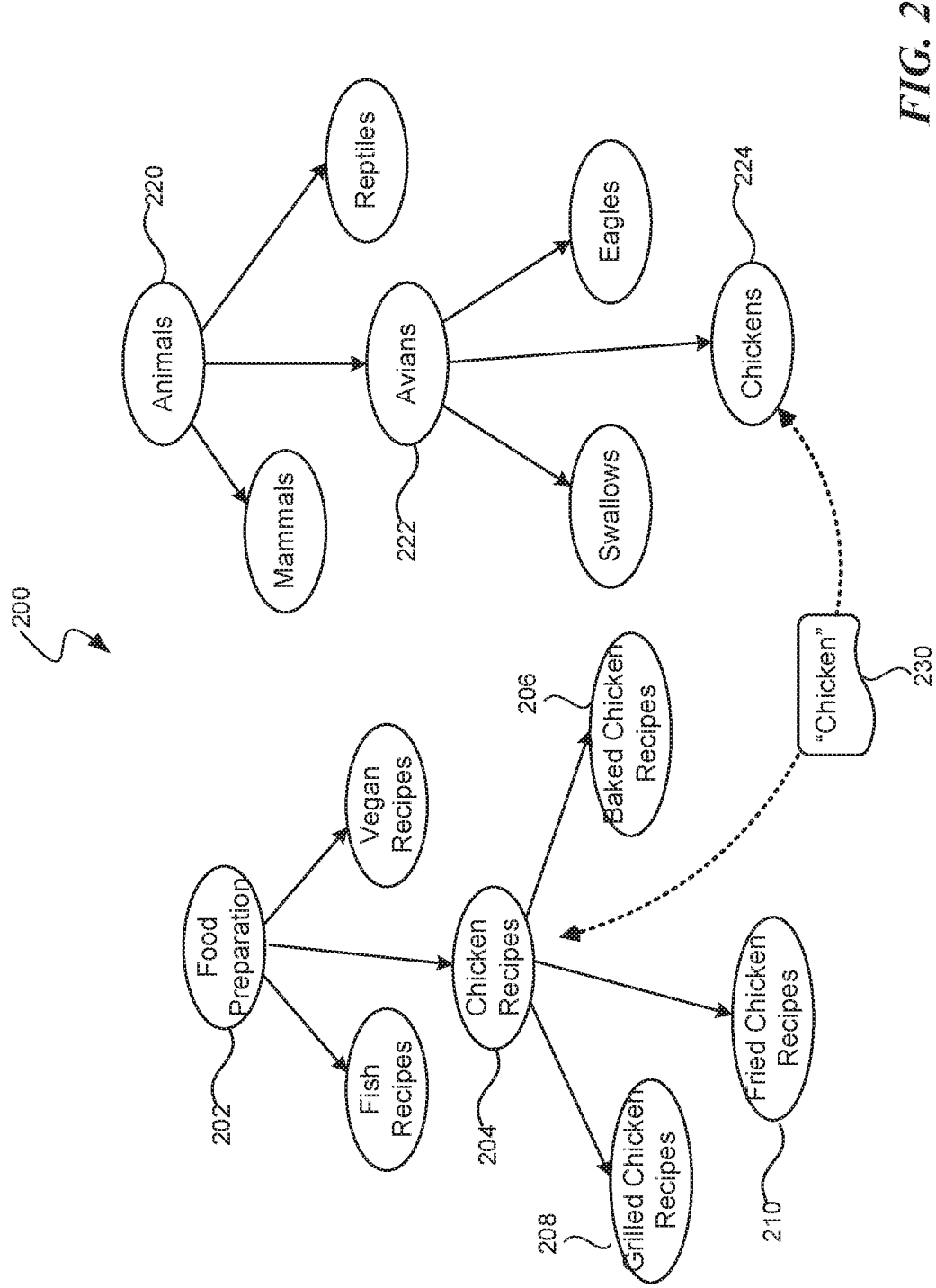
FIG. 2 is a block diagram illustrating two exemplary branches of an interest taxonomy that may be used in identifying relevant content to a text-based query, in accordance with aspects of the disclosed subject matter.

FIG. 2 is a block diagram illustrating two exemplary branches of an interest taxonomy 200 that may be used in identifying relevant content to a text-based query, in accordance with aspects of the disclosed subject matter. As shown in FIG. 2, the two branches include a branch stemming from an interest node 202 corresponding to "Food Preparation,"

and another branch stemming from an interest node 220 corresponding to "Animals." As discussed above, each node that is lower (stems from) an upper node is a more specific example of the upper node. For example, interest node 208 "Grilled Chicken Recipes," interest node 206 "Baked Chicken Recipes," and interest node 210 "Fried Chicken Recipes," each stem from (or is a specific element of) interest node 204 "Chicken Recipes," which, in turn, stems from interest node 202 "Food Preparation." Similarly, interest node 224 "Chicken," stems from interest node 222 "Avians," which stems from interest node 220 "Animals."

As can be seen, the descriptive labels associated with interest nodes often use overloaded terms or words. For example, the term "chicken" is found in interest nodes 204, 206, 208, 210 and 224. This overloading creates a challenge for an online service that uses an interest taxonomy to discover relevant content for a query: when a computer user 101 submits a query, such as query 230 "chicken," that is or includes an overloaded term, which interest taxonomy is implicated? As will be described in greater detail below, the query response process 112 identifies one or more likely interest nodes within the interest taxonomy 118 in response to a text-based query, identifies relevant content items from its corpus 114 of content items based on the identified one or more likely interest nodes, and returns at least some of the identified, relevant content items to the user as response content 116.

Figure 3:
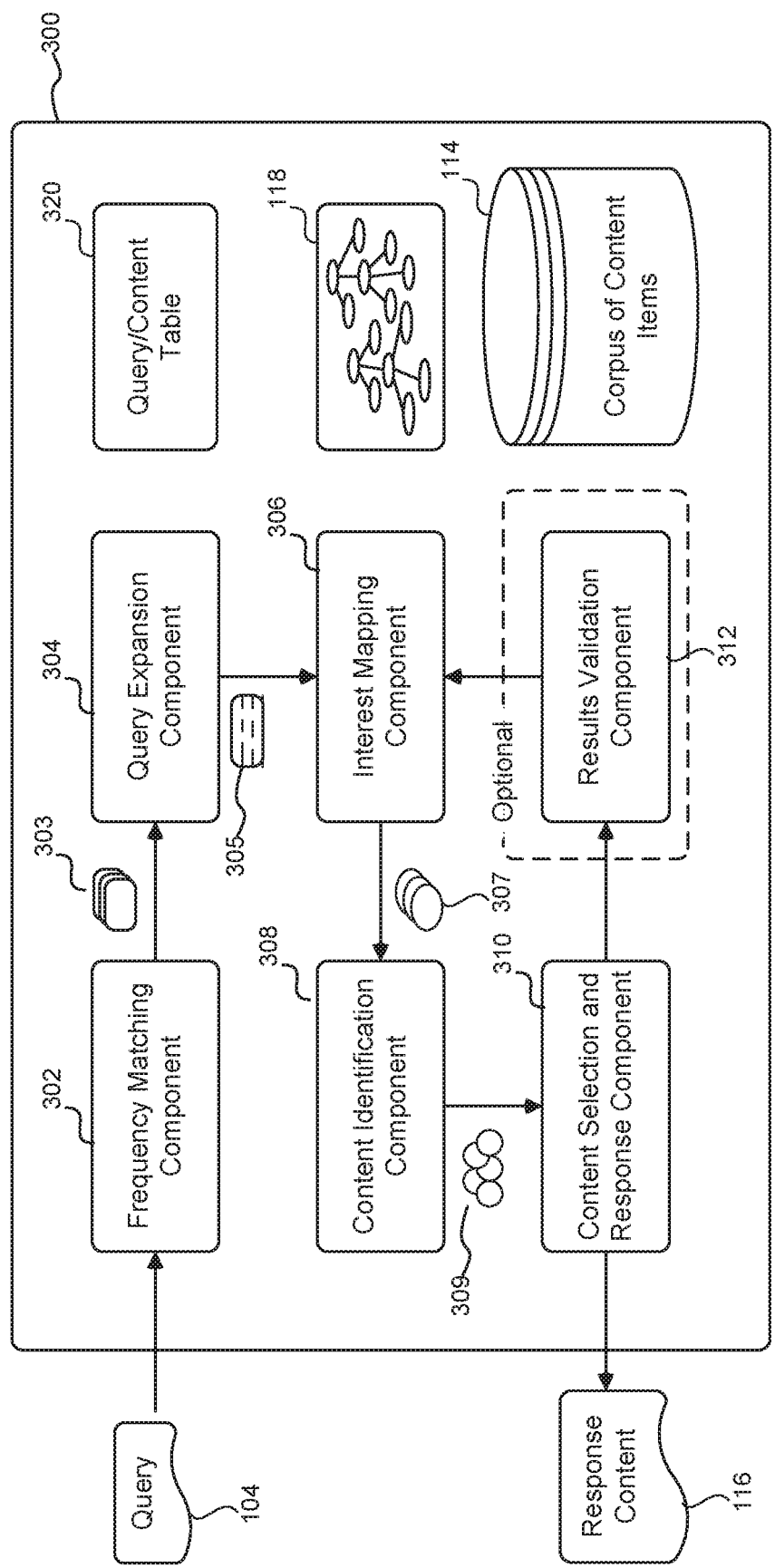
FIG. 3 is a block diagram illustrating exemplary elements of a query response component suitable for identifying relevant content items in response to a user's text-based query, in accordance with aspects of the disclosed subject matter.

Regarding the query response process 112, reference is now made to FIG. 3. FIG. 3 is a block diagram illustrating exemplary elements of a query response component 300 suitably configured to identify relevant content items in response to a user's text-based query 104, all in accordance with aspects of the disclosed subject matter. Indeed, the elements of the query response component 300 carry out the query response process mentioned above regarding FIG. 1.

In response to receiving a text-based query 104 from a user 101, a frequency matching component 302 conducts a mapping to identify one or more most-popular or most-engaged content items from the corpus 114 of content items associated with the text-based query. This popularity or engagement is based on a variety of factors, including the frequency that a content item appears in response to this same text-based query from all users of the online service, the frequency with which users interact or engage with the content item when it is provided in a response to the text-based query, and/or the overall popularity of the content item among the online service's subscribing users. These factors will typically, though not exclusively, consider historical user engagements with the various content items of the corpus, and/or engagements with the content items during a most-recent time period, e.g., the prior two years, the prior three months, etc. Engagement scores of content items to text-based queries may be periodically generated in a manner asynchronous to receiving the text-based query 104. Determining these engagement scores asynchronously to receiving any specific text-based query facilitates an apparent "instantaneous" responsiveness to a user's text-based query, such as text-based query 104. Regarding "engagement," engagement may be measured according to how long all users viewed a particular content item (or viewed the particular content item over a threshold amount of time), and/or how many users interacted with (e.g., clicked, commented and/or annotated, liked, copied, reposted, etc.) a particular content item.

As suggested and according to various aspects of the disclosed subject matter, the mapping of the text-based query to one or more most-engaged content items associated with the text-based query 104 is carried out through the use of an indexed query/content table 320, asynchronously generated to the receipt of the text-based query 104, that associates text-based queries and popularity or engagement scores or counts to content items within the corpus 114 of content items. The result of the frequency matching component 302 is a set 303 of one or more most-engaged content items from the corpus 114 of content items corresponding to the received text-based query 104.

According to aspects of the disclosed subject matter, a query expansion component 304 generates an expanded query 305 by aggregating the received text-based query 104 and one or more text-based terms associated with the content items of the set 303 of one or more most-engaged content items corresponding to the received text-based query. The query expansion component 304 identifies textual content associated with the content items of the set 303 of one or more most-engaged content items corresponding to the received text-based query. This textual content associated with the set 303 of one or more most-engaged content items may include, by way of illustration and not limitation, one or more of a user's annotations of the content items, content titles of the content items, captions within and/or associated with the content items, the content items file name, a source path (e.g., a uniform resource locator or "URL," or uniform resource identifier or "URI") indicating an external source location of the content items, and the like.

After identifying the textual content, the query expansion component 304 identifies at least one additional term, and frequently many terms, from the identified textual content that are not part of the received text-based query 104. The query expansion component 304 combines or aggregates the terms (or term) of the text-based query with the at least one additional term from the identified textual content to generate an expanded query 305.

In the course of identifying one or more text-based terms, the query expansion component 304 may face one of two extremes in identifying one or more text-based terms from the most-engaged content items: a content item is not associated with sufficient textual content to extract any terms, or that the textual content associated with a content item includes "noisy" terms, i.e., terms that should be filtered out, terms that are meaningless, etc.

In the event of not enough textual content associated with a most-engaged content item, the query expansion component 304 can use a pre-trained content classifier (such as an image classifier) to generate text-based classification information for the most-popular content item. This classification information becomes the textual content associated with that most-engaged content item. In the alternative, the text-based content of a most-engaged content item may be filtered to remove rare, meaningless and/or unknown words, or correct misspellings, and the like, to create a body of text associated with the content item.

According to various embodiments of the disclosed subject matter, the query expansion component 304 utilizes a set of heuristics to select expansion terms (i.e., terms to be included in the expanded query) according to their importance, while common terms, offensive terms, non-sensical terms, and/or meaningless terms are filtered out. So-called "white lists" may be used to identify likely important terms, as well as techniques such as TF/IDF (term frequency/inverse document frequency), or a combination of several techniques. According to aspects of the disclosed subject matter, the white lists may be specifically tailored or curated to correspond or match well to the text-based labels of the interest nodes of the interest taxonomy 118. While in embodiments of the disclosed subject matter an expanded query may be generated from the text-based query 104 and a single text term from the one or more most-engaged content items, in alternative embodiments, an expanded query may be generated from the text-based query 104 and plurality of text terms from the one or more most-engaged content items, resulting in an expanded query 305 often comprising at least 13 words/terms.

According to aspects of the disclosed subject matter, an interest mapping component 306 maps the expanded query 305 to one or more interest nodes of the interest taxonomy 118. In accordance with aspects of the disclosed subject matter, the interest mapping component 306 utilizes a trained machine learning mapping model to map expanded queries to one or more interest nodes of the interest taxonomy, thereby creating a set 307 of likely interest nodes. More particularly, the interest mapping component 306, via the trained mapping model, generates a predicted score for the interest nodes of the interest taxonomy 118 based on an expanded query 305, and selects one or more interest nodes according to the generated scores as a set 307 of most-likely interest nodes for the expanded query. A more detailed discussion of mapping an expanded query 305 to a set 307 of most-likely interest nodes for the expanded query is set forth below regarding FIG. 5.

According to aspects of the disclosed subject matter, a content identification component 308 uses the set 307 of most-likely interest nodes to identify content items within the corpus 114 of content items that correspond to the interest nodes of the set of most-likely interest nodes. According to aspects of the disclosed subject matter, the content identification component 308 identifies a set 309 of content items that are associated with one or more of the interest nodes of the set 307 of most-likely interest nodes. These identified content items may be further identified or selected according to their overall popularity to one or more users of the online service 110, or according to their perceived importance to the various interest nodes of the set 307 of most-likely interest nodes.

According to aspects of the disclosed subject matter, a content selection and response component 310 selects a subset of the content items from the set 309 of content items according to their determined popularity and/or importance and returns the subset of content items to the requesting user as the response content 116.

According to aspects of the disclosed subject matter, a results validation component 312 may be used to analyze the subset of content items returned to the requesting user in view of the text-based query 104 to validate that relevant content items that were returned as response content 116. In doing so, the results validation component 312 may determine the relevance of the text-based query 104 to the subset of content items. The analysis may be conducted in an off-line manner and may be conducted by a machine learning model trained to determine the relevance of response content 116 to a text-based query 104. Intermediate results, including the set 303 of the one or more most-engaged content items, the expanded query 305, the set 307 of most-likely interest nodes, and the set 309 of content items may also be included in this validation analysis. The results of the analysis may be used to update or retrain the various elements of the query response component 300, including the mapping model associated with the interest mapping component 306. Additionally, the results of the analysis may be used to update the interest mapping of a more general text-to-text search engine, particularly in regard to identifying the context, user sentiment and/or semantics of a given text-based query. In addition to updating the matter, this information may be used to update query-to-interest mappings in a query-interest node table that may be used in a variety of circumstances. For example, and by way of illustration, an update to a text-to-text based search engine based on the results of the analysis of the results validation component 312 may provide greater weight to that text-to-text based search engine to map a query "chicken" to one or more chicken recipes.

Figure 4:
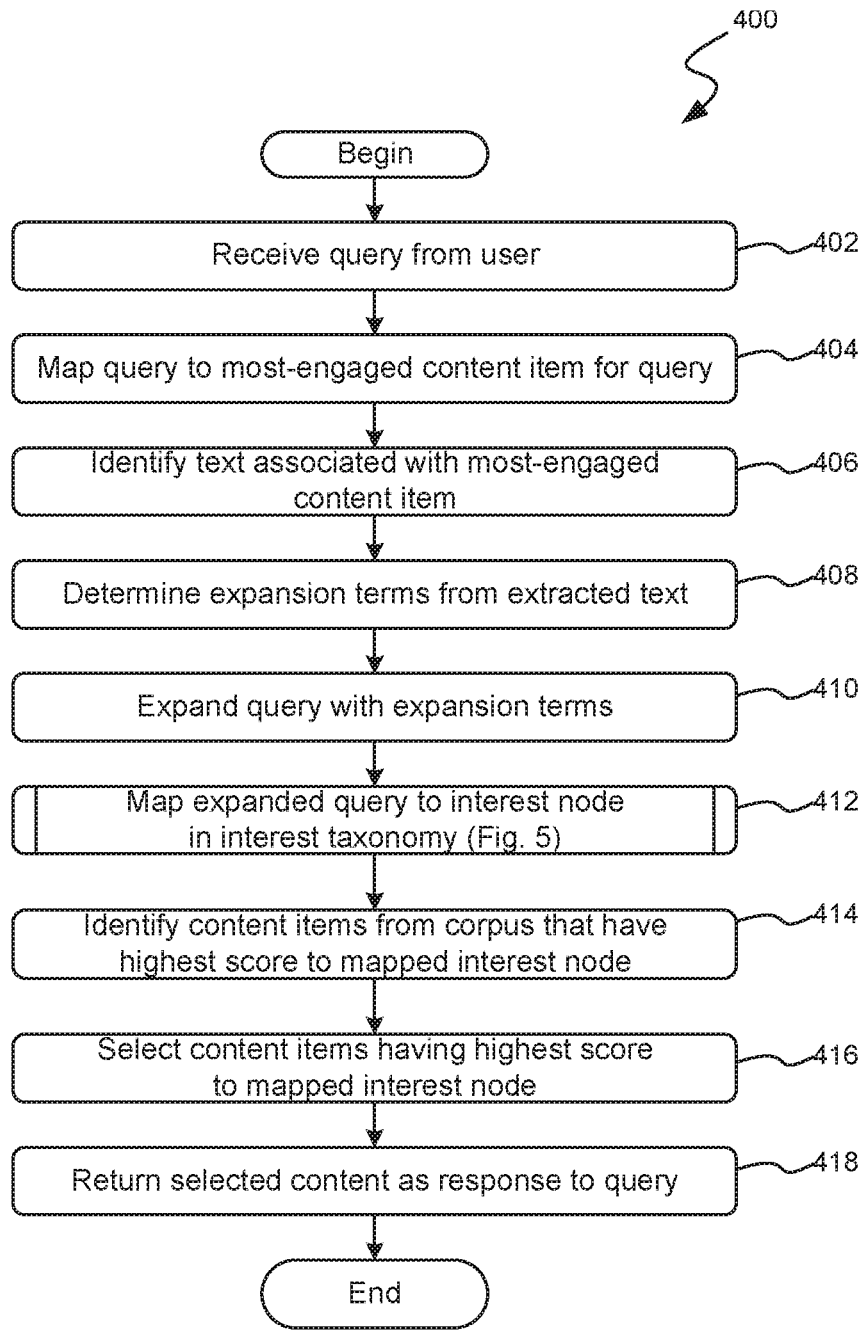
FIG. 4 is a flow diagram illustrating an exemplary routine for identifying relevant content in response to a user's text-based query, in accordance with aspects of the disclosed subject matter.

Turning now to FIG. 4, FIG. 4 is a flow diagram illustrating an exemplary routine 400 for identifying relevant content from a corpus 114 of content items, maintained as non-text-based items, in response to a user's text-based query, in accordance with aspects of the disclosed subject matter. As will be appreciated, routine 400 generally corresponds to the overall process set forth in regard to the description above of the query response component 300. Additionally, it should be appreciated that the query response process 112 of FIG. 1 generally corresponds to the execution of routine 400 by the online service 110.

While the disclosed subject matter contemplates discovering one or more most-engaged content items of a corpus 114 for a text-based query 104, mapping an expanded query to one or more most-likely interest nodes of an interest taxonomy 118, and identifying content items according to the one or more most-likely interest nodes, for simplicity in description, the following discussion of routine 400 is made in regard to identifying a single most-engaged content item of a corpus 114 of content items, mapping an expanded query to a single most-likely interest node of an interest taxonomy 118, and identifying content items according to the single most-likely interest node. It should be appreciated, however, that aspects of routine 400 are not so limited.

Beginning at block 402, a text-based query 104 is received from a user 101 over a network 108 by an online service 110. As indicated above, this text-based query 104 is a request for relevant content from the online service that maintains a corpus 114 of content items arranged as a corpus of visual content items. At block 404, the frequency matching component 302 maps the received text-based query 104 to a most-engaged content item of the corpus 114 of content items, where the most-engaged content item corresponds to the content item most-engaged with in responses to the text-based query 104 from all users of the online service 110 to this same text-based query. As indicated above, the mapping of the text-based query to a most-engaged content item associated with that query is carried out through the use of an indexed query/content table 320 that associates text-based queries and popularity or engagement scores or counts to content items within the corpus 114 of content items. The result is the identification of the most-engaged content item corresponding to the received text-based query 104.

At block 406, the query expansion component 304 identifies and/or accesses text-based content associated with the identified most-engaged content item. Text-based content associated with the identified most-engaged content item may include, by way of illustration and not limitation, one or more of a user's annotations of the content item, a content title of the content item, captions within and/or associated with the content item, the content item's file name, a source path (e.g., a uniform resource locator or "URL," or uniform resource identifier or "URI") indicating an external source location of the content item, and the like. As indicated above, in some instances when there is insufficient or no text-based content associated with the most-engaged content item, text-based content may be generated by a content classifier, particularly the classification (text-based information) of the most-engaged content item.

At block 408, the query expansion component 304 determines a set of expansion terms from the identified text-based content of block 406. According to aspects of the disclosed subject matter, the query expansion component 304 identifies at least one additional term from the identified textual content, that is not part of the received text-based query 104, and combines the at least one term or terms of the text-based query with the at least one additional term from the identified textual content to generate an expanded query 305. In various embodiments of the disclosed subject matter, the query expansion component 304 utilizes a set of heuristics to select expansion terms (terms to be included in the expanded query) according to their importance to the content, while common terms are filtered out. So-called "white lists" may be used to identify important terms, as well as techniques such as TF/IDF (term frequency/inverse document frequency), or a combination of several techniques.

At block 410, the received text-based query 104 and the set of expansion terms are concatenated, resulting in an expanded query.

At block 412, the expanded query 305 is mapped to an interest node of the interest taxonomy 118 by an interest mapping component 306. As mentioned above and in accordance with aspects of the disclosed subject matter, the interest mapping component 306 utilizes an executable machine learning mapping model that has been trained to map expanded queries to one or more interest nodes of the interest taxonomy, thereby identifying a most-likely interest node for the expanded query. In execution, the interest mapping component 306, via the trained mapping model, generates a predicted score for the interest nodes of the interest taxonomy 118 in respect to the expanded query 305, and selects a highest-scoring interest node as the most-likely interest node for the expanded query. This selection is made according to the generated, predicted scores, where the predicted scores are indicative of the likelihood that the corresponding interest taxonomy is a match for the expanded query 305. Mapping the expanded query to an interest node of the interest taxonomy 118 is described in greater detail below in the discussion of routine 500 of FIG. 5.

With the most-likely interest node for the expanded query 305 identified, at block 414 the content identification component 308 identifies a set 309 of content items from the corpus 114 of content items that are associated with the most-likely interest node. In accordance with aspects of the disclosed subject matter, an overall popularity (measured as the popularity of each item to users of the online service 110) can be determined for each of the content items. According to alternative embodiments of the disclosed subject matter, a score (e.g., an importance score) measuring the importance of the content items of the set 309 of content items to the expanded query 305 may be determined. This importance score measures a predicted importance of the expanded query 305 to a given content item of the set 309 of content items.

At block 416, a subset of the content items from the set 309 of content items is selected according to the scores associated with the content items of the set. In various embodiments, the number of content items in the subset may be dependent upon the capacity of the user's computing device 102 to display responsive content. At block 418, the subset of content items is returned as response content 116 to the user. Thereafter, the routine 400 terminates.

Figure 5:
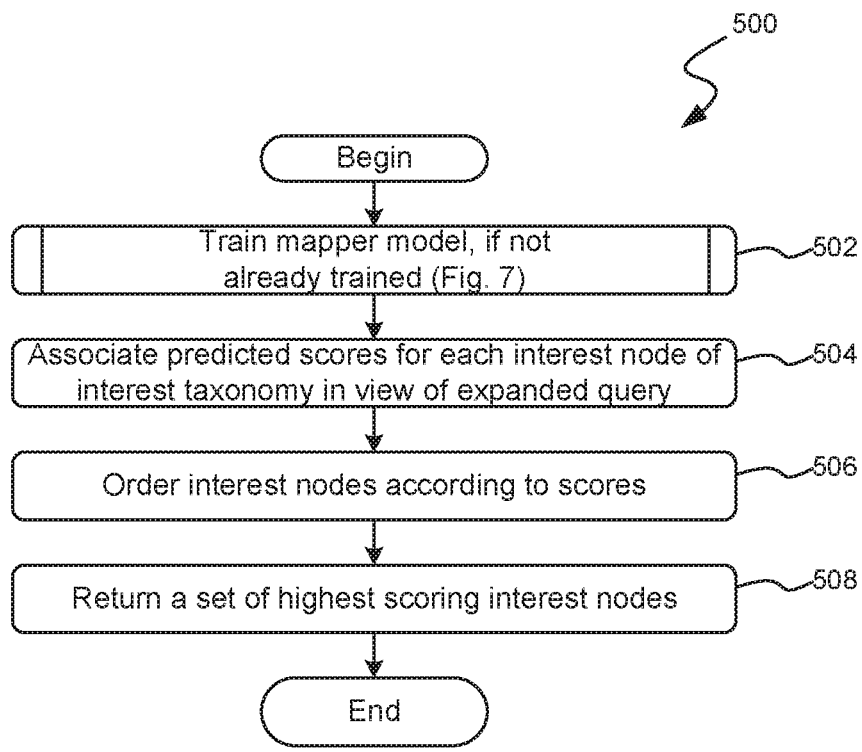
FIG. 5 is a flow diagram illustrating an exemplary routine for mapping an expanded query to one or more interest nodes of an interest taxonomy, in accordance with aspects of the disclosed subject matter.

Turning now to FIG. 5, FIG. 5 is a flow diagram illustrating an exemplary routine 500 for mapping an expanded query, such as expanded query 305, to one or more interest nodes of an interest taxonomy 118, in accordance with aspects of the disclosed subject matter. Beginning at block 502, a machine learning mapping model is trained to generate predicted scores for each interest node of the interest taxonomy 118 in view of an expanded query 305. Of course, as those skilled in the art will appreciate, training the mapping model need not occur for each received query from a user. Rather, training must be carried out—though it may be carried out asynchronously from receiving a text-based query 104 from a user 101, but once the machine learning mapping model is trained, it can be reused any number of times to generate predicted scores for each interest node of the interest taxonomy 118 in view of expanded queries. A general routine for training a machine learning mapping model, particularly a deep neural network trained as a mapping model, to generate predicted scores for interest nodes of an interest taxonomy in view of an expanded query is set forth below regarding routine 700 of FIG. 7.

According to aspects of the disclosed subject matter, there are many different machine learning models that could be suitably trained as a mapping model to generate predicted scores for interest nodes of an interest taxonomy 118 in view of an expanded query. In various embodiments, deep neural networks (a specific type of machine learning model) have been shown to provide very good predicted results. Exemplary deep neural networks (DNNs) that may be suitably trained to generate predicted scores for interest nodes of an interest taxonomy 118 in view of an expanded query include, by way of illustration and not limitation: fastText neural networks; convolutional neural networks (CNNs); recurrent neural networks (RNNs); CNN+RNN vertical neural networks; CNN+RNN horizontal neural networks; and Hierarchical Attention Networks (HANs). As can be readily appreciated by those skilled in the art, each of these models has both advantages and disadvantages, though various non-limiting embodiments have shown thatfastText models produce good predicted results with faster training speeds.

With reference again to FIG. 5, after training the mapping model (if it was not already trained), at block 504, the mapping model generates predicted scores for each of the interest nodes of the interest taxonomy 118 in view of the expanded query 305. According to aspects of the disclosed subject matter, the predicted scores indicate a likelihood that a corresponding interest node is a good match for the expanded query.

At block 506, a listing of the interest nodes is ordered according to the predicted scores associated with the interest nodes, thereby indicating which interest nodes are the most likely matches for the expanded query. At block 508, a set of highest-scoring interest nodes (which may be accompanied with their predicted scores) is selected and returned as the result of routine 500. Thereafter, the routine 500 terminates.

Figure 6:
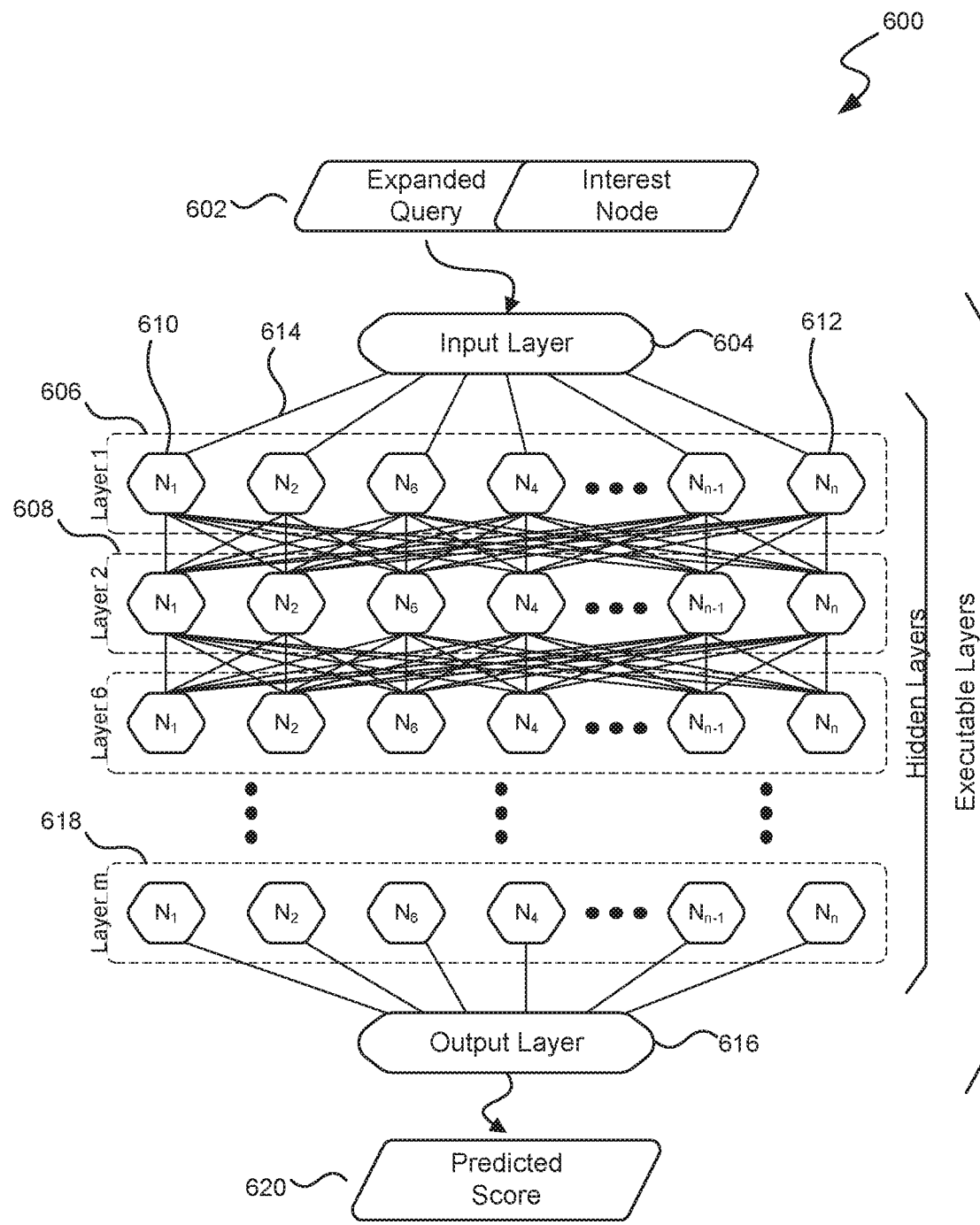
FIG. 6 is a block diagram illustrating general elements of a deep neural network suitable for training to generate predicted scores for interest nodes of an interest taxonomy as likely matches of an expanded query, in accordance with aspects of the disclosed subject matter.

As indicated in block 502 above, the mapping model is typically implemented as a machine learning model, and particularly and advantageously as a deep neural network. Regarding deep neural networks, reference is now made to FIG. 6. FIG. 6 is a block diagram illustrating general elements of a deep neural network 600 suitable for training to generate predicted scores for interest nodes of an interest taxonomy 118 as likely matches of an expanded query 305, in accordance with aspects of the disclosed subject matter.

As those skilled in the art will appreciate, a deep neural network 600 comprises multiple executable layers, including an input layer 604, an output layer 616, and one or more hidden layers. By way of illustration, the exemplary deep neural network 600 includes m hidden layers, including hidden layers 606, 608 and 618. The input layer 604 accepts elements of the input data upon which the deep neural network 600 will be trained. In the present instance, the input layer 604 accepts input data 602 comprising an expanded query and an interest node of an interest taxonomy (or the text label of the interest node of the interest taxonomy).

Operating on the input data 602, the various layers (including the input layer 604, the hidden layers 606, 608 and 618, and output layer 616) utilize one or more predetermined algorithms and/or heuristics to process the input they receive, with each layer generating output values to other layers (except for the output layer). These internal output values, not shown in FIG. 6 but implied by the various edges between processing layers, such as edge 614 extending from the input layer 604 to the various processing nodes of the first hidden layer 606, such as processing nodes 610 and 612, comprise the results of the convolutional processing that is performed by each respective layer. As part of the processing, internal values generated from the input data 602 are passed from the processing node (or nodes) of the input layer 604 to processing nodes of a next layer, i.e., hidden layer 606, as part of the processing that occurs within the deep neural network 600.

Each hidden layer, including hidden layers 606, 608 and 618, typically comprises a plurality of processing or convolutional nodes. For example, and by way of illustration and not limitation, hidden layer 606 includes n processing nodes, $N_1$–$N_n$. While the processing nodes of the first hidden layer 606 typically, though not exclusively, have a single input value from the input layer 604, processing nodes of subsequent hidden layers may have input values from one or more processing nodes of the previous processing layer.

In various embodiments and as illustrated in the exemplary deep neural network 600, each hidden layer (except for the first hidden layer 606) accepts input data/signals from each processing node of the prior hidden layer, as indicated by the edges proceeding from a processing node of an "upper" hidden layer (e.g., layer 606) to a "lower" hidden layer (e.g., layer 608). Of course, alternative embodiments need not include such wide distribution of output values to the processing nodes of a subsequent, lower level.

As mentioned, each processing node carries out one or more "convolutions," "computations" or "transformations" on the input data it receives (whether the processing node receives a single-item of input data, or plural items of input data) to produce a single output value. These convolutions, projections, and/or transformations may include any number of functions or operations to generate the output data such as, by way of illustration and not limitation, data aggregations, clustering various input values, transformations of input values, combinations of plural input values, selections and/or filterings among input values, mathematical manipulations of one or more input values, linear and/or multivariate regressions of the input values, statistical determinations of the input values, predictive evaluations, and the like. Moreover, individual items of input data may be weighted in any given processing node such that the weighted input data plays a greater or lesser role in the overall computation for that processing node. Items of input data may be weighted in such a manner as to be ignored in the various convolutions and computations. Hyperparameters (data/values that are input from sources external to processing nodes of a prior processing layer) may also be utilized by all or some of the processing nodes of a hidden layer.

As will be appreciated by those skilled in the art, one of the interesting aspects of training machine learning models, including deep neural networks, is that the various nodes of the processing layers of the deep neural networks are adaptable to accommodate self-learning. In other words, when provided feedback, modifications may be made to the weights, parameters, and processing or convolutional operations of the processing nodes in the various processing layers, in order to achieve desired results. Due to this adaptability, except for initially established computations of the various processing nodes in a training phase of the machine learning process, without significant tracking and study, a person is unlikely to have specific insight or knowledge as to the exact nature of output values of the processing nodes and, correspondingly, the exact nature of convolutions and/or computations that any particular processing node of a hidden layer may utilize. Instead, during the training process of a deep neural network, the deep neural network adaptively makes its own determinations as to how to modify each value, hyperparameter, weighting, computation, convolution or transformation of a given processing node to produce better and/or superior results from the input values it receives.

At the final hidden layer, e.g., hidden layer 618, the processing nodes provide their output data to the output layer 616. The output layer 616 performs whatever final aggregations, calculations, transformations, projections, normalizations and/or interpretations of the various items of input data to produce a final, predicted result. In the present case, the resulting output value 620 corresponds to a predicted score indicative of the likelihood that the input interest node of the interest taxonomy 118 is the correct interest node for the expanded query 305.

Figure 7:
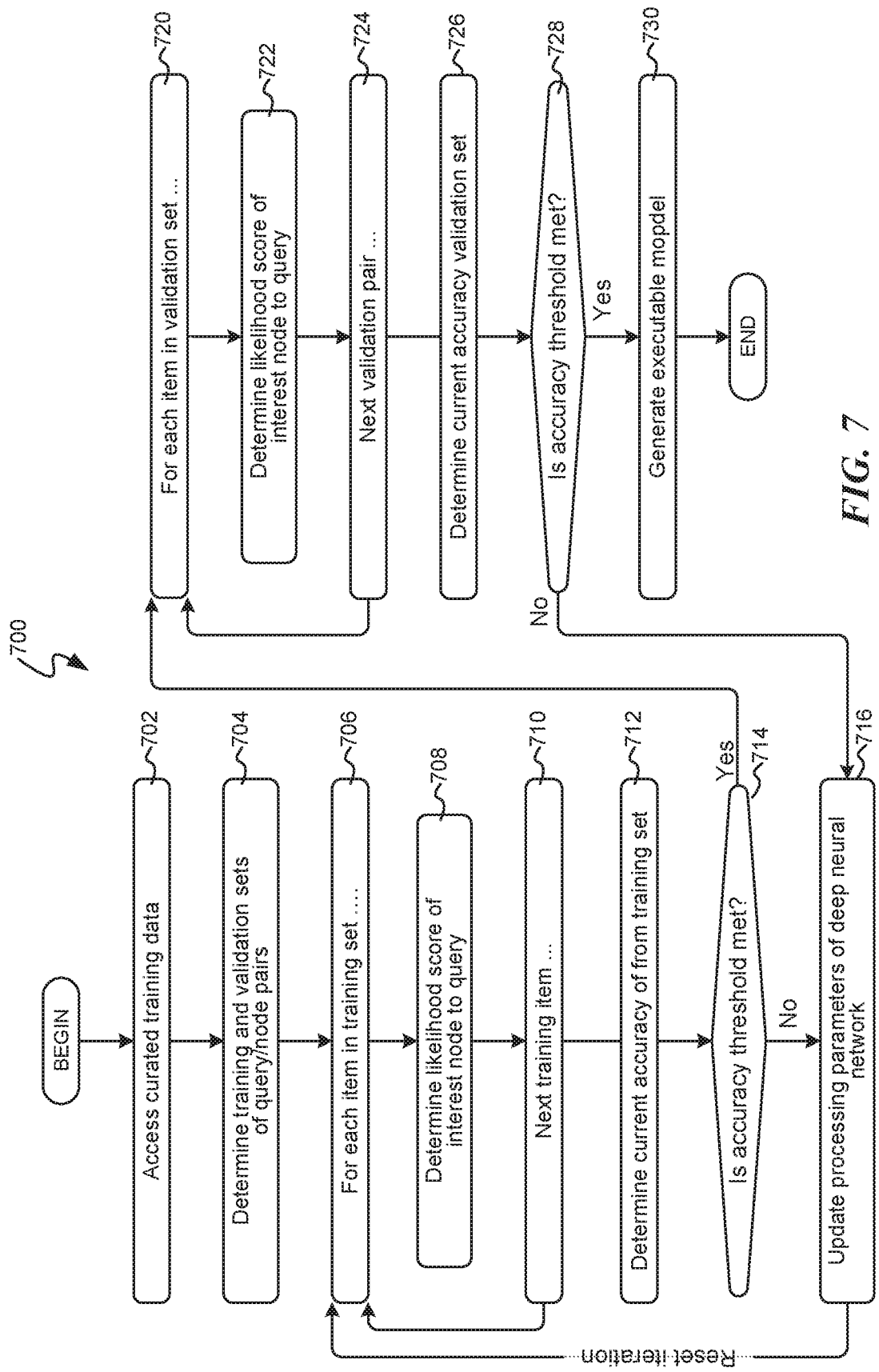
FIG. 7 is a flow diagram illustrating an exemplary routine suitable for training a deep neural network to generate predicted scores for interest nodes of an interest taxonomy as likely matches of an expanded query, in accordance with aspects of the disclosed subject matter.

Regarding the training of a deep neural network, such as deep neural network 600, reference is now made to FIG. 7. FIG. 7 is a flow diagram illustrating an exemplary routine 700 suitable for training a deep neural network to generate predicted scores for interest nodes of an interest taxonomy 118 as matches of an expanded query 305, in accordance with aspects of the disclosed subject matter.

Beginning at block 702, training data comprising query/ node pairs is accessed. According to aspects of the disclosed subject matter, each of the query/node pairs corresponds to a query (e.g., an expanded query 305) and an interest node (or the text-based label of the interest node). This training data is curated data in that each query/node pair is also associated with a true value, the true value indicative of how semantically close the interest node is to the query, i.e., an actual score. At block 704, a training set and a validation set of query/interest node pairs are determined, comprising a typically random division of the accessed training data.

At block 706, an iteration loop is begun to iterate through each query/node pair of the training set. Accordingly, at block 708, the deep neural network processes the currently iterated query/node pair and the result, i.e., the predicted likelihood that the interest node is the correct interest node of the interest taxonomy for the query, and saves for further evaluation. At block 710, if there are additional query/node pairs in the training set, the routine 700 returns to block 706 to process the next query/node of the training set. Alternatively, if there are no additional query/node pairs in the training set to process, the routine proceeds to block 712.

At block 712, the current accuracy of the deep neural network in processing the training set of query/node pairs is determined. This determination is made through comparisons of the true value of a query/node pair with the predicted results of the deep neural network 600. At decision block 714, a determination is made as to whether the determined accuracy resulting from processing the training set meets a predetermined accuracy threshold. If, at decision block 714, the accuracy threshold is not met, the routine 700 proceeds to block 716 where processing parameters of the deep neural network 600 are updated. Thereafter, the routine 700 returns to block 706 to reset and repeat the iteration loop described above.

At decision block 714, if the accuracy threshold is met, the routine 700 proceeds to block 720, corresponding to a validation phase to validate the current accuracy of the deep neural network. Indeed, at block 720, another iteration loop is begun, this time to iterate through the query/node pairs of the validation set. At block 722, the currently iterated query/node pair of the validation set is processed by the deep neural network 600 and the results are temporarily saved for further evaluation. At block 724, if there are additional query/node pairs in the validation set to be processed, the routine 700 returns to block 720 to process the next pair. Alternatively, if there are no additional training pairs in the validation set, the routine 700 proceeds to block 726.

At block 726, the accuracy of the deep neural network is determined in consideration of the results of processing the query/node pairs of the validation set. This evaluation results in a current accuracy score for the deep neural network 600. At decision block 728, if the current accuracy score for the deep neural network fails to at least meet a predetermined accuracy threshold, the routine 700 proceeds to block 716 where the processing parameters of the deep neural network are updated, after which the routine 700 proceeds to block 706 to reset and repeat the iteration of the training set and the validation set described above. Alternatively, if the current accuracy score for the deep neural network meets or exceeds the predetermined threshold, the routine 700 proceeds to block 730.

At block 730, an executable model, i.e., the mapper model, of the now-trained and accurate deep neural network 600 is generated for use in determining predicted scores between an expanded query and an interest node of an interest taxonomy. Thereafter, the routine 700 terminates.

Regarding routines 400, 500 and 700 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing system described in FIG. 8 below. Additionally, in various embodiments, all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer executable instructions stored by computer-readable media, also referred to as computer-readable storage media, which (for purposes of this disclosure) are articles of manufacture. As those skilled in the art will recognize, computer-readable media can host, store and/or reproduce computer executable instructions and data for later retrieval and/or execution. When the computer executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer executable instructions and data to a computing device for execution by one or more processors via various transmission means and mediums, including carrier waves and/or propagated signals, for purposes of this disclosure computer-readable media expressly excludes carrier waves and/or propagated signals.

Figure 8:
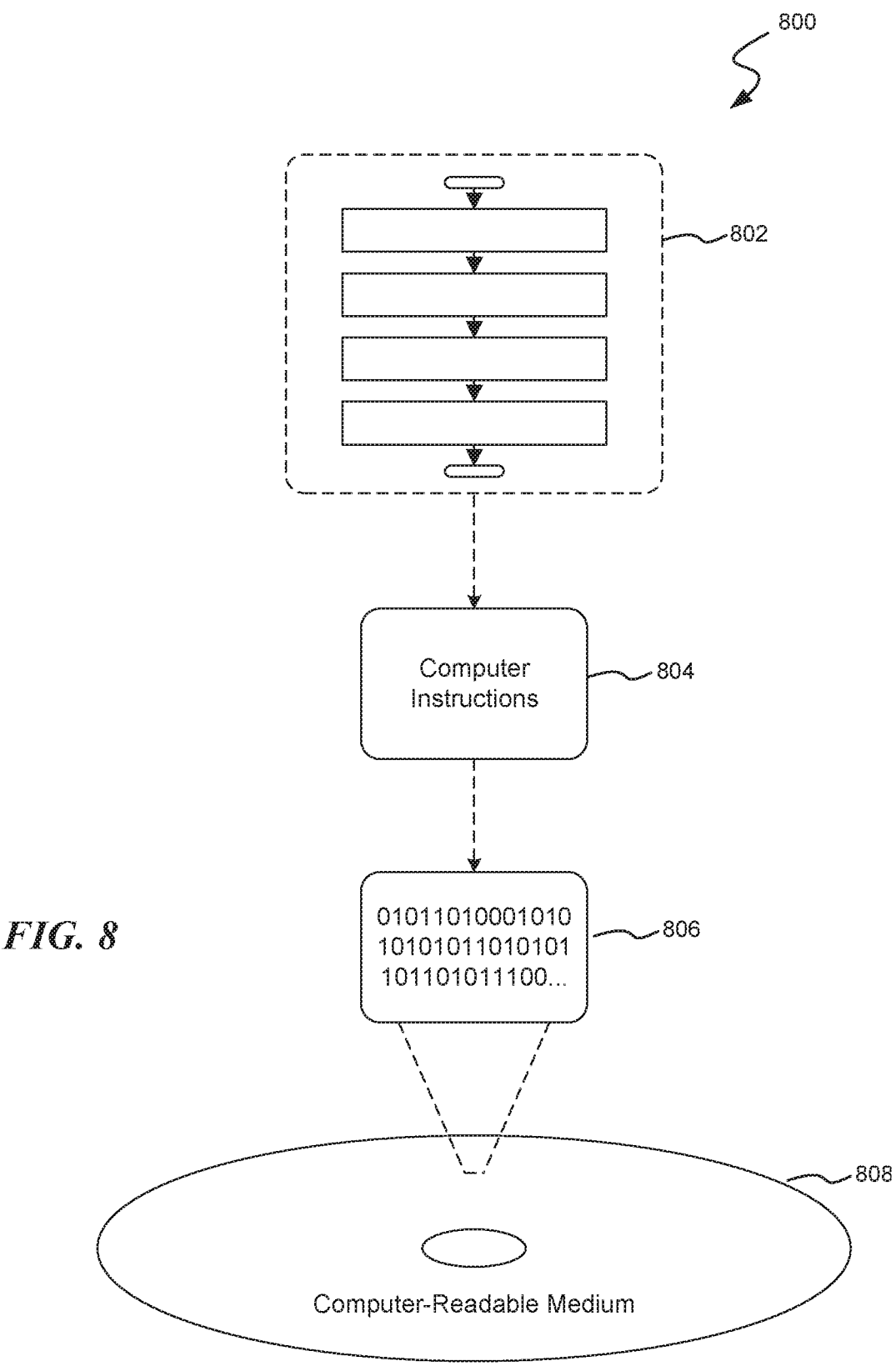
FIG. 8 is a block diagram of an exemplary computer-readable medium encoded with instructions for identifying relevant content in response to a user's text-based query, in accordance with aspects of the disclosed subject matter.

Regarding computer-readable media, FIG. 8 is an exemplary computer-readable medium 800 bearing instructions for implementing an online service, such as online service 110, and particularly in regard to instructions for identifying relevant content from a corpus of content items maintained by the online service in response to a user's text-based query, in accordance with aspects of the disclosed subject matter.

As shown in FIG. 8, the computer-readable medium 800 comprises a computer-readable structure 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment, the processor-executable instructions 804, in execution on a computer system, may configure the system to implement an online service 110, including identifying relevant content in response to a user's text-based query, in accordance with aspects of the disclosed subject matter. As those skilled in the art will appreciate, the processor-executable instructions are typically, though not exclusively, generated from text-based instructions 802 that are converted to the processor-executable instructions by a compilation process.

Figure 9:
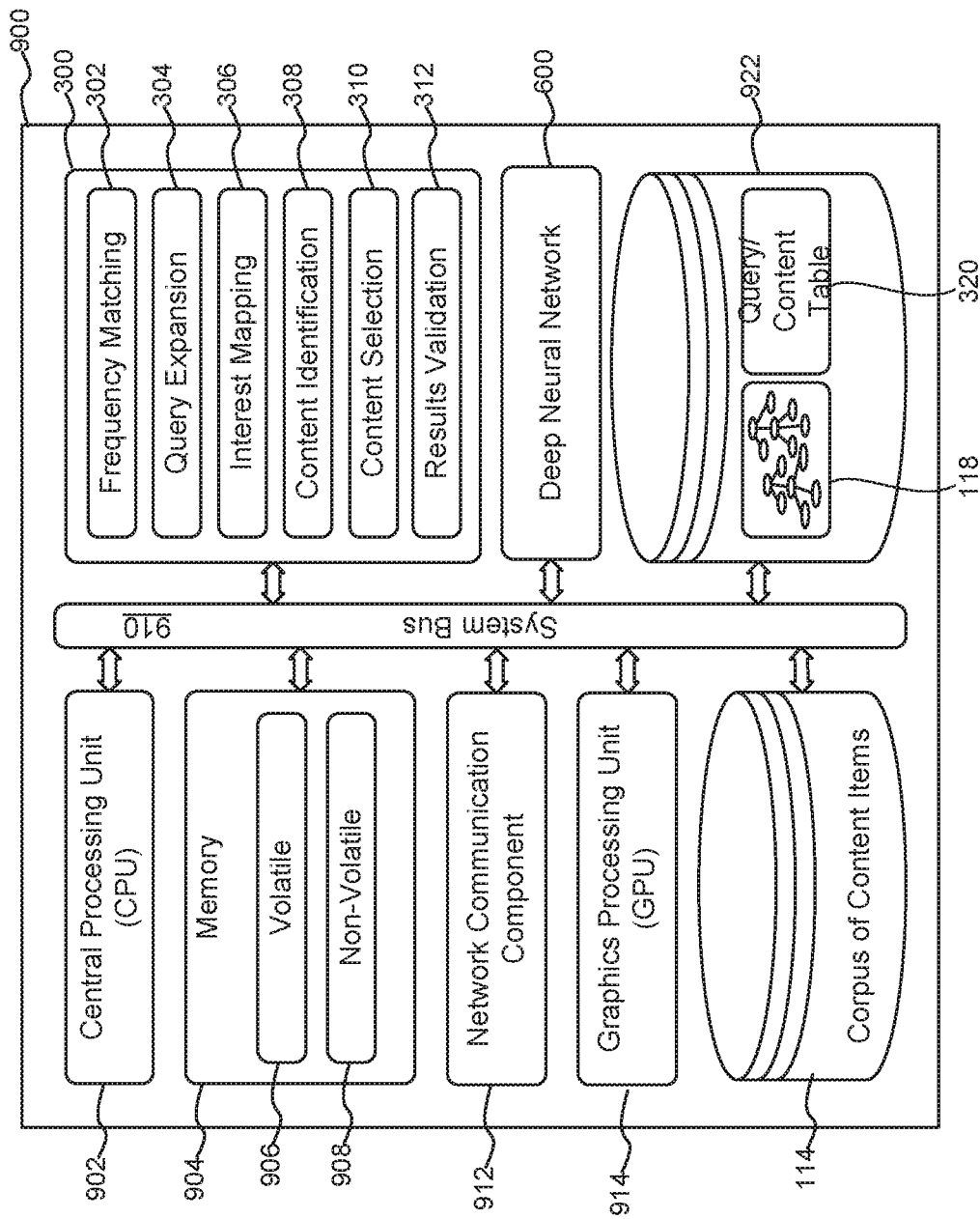
FIG. 9 is a block diagram illustrating exemplary components of a computer system suitable for identifying responsive content to a user's text-based query from a corpus of content items, in accordance with aspects of the disclosed subject matter.

Turning to FIG. 9, FIG. 9 is a block diagram illustrating logical, executable components of an exemplary computer system 900 suitable for identifying responsive content to a user's text-based query 104 from a corpus 114 of content items, in accordance with aspects of the disclosed subject matter. The computer system 900 typically includes one or more central processing units (or CPUs), such as CPU 902, and further includes at least one memory 904. The CPU 902 and memory 904, as well as other components of the computer system, are interconnected by way of a system bus 910.

As will be appreciated by those skilled in the art, the memory 904 typically (but not always) comprises both volatile memory 906 and non-volatile memory 908. Volatile memory 906 retains or stores information so long as the memory is supplied with power. In contrast, non-volatile memory 908 can store (or persist) information even when a power supply is not available. In general, RAM (random access memory) and CPU cache memory are examples of volatile memory 906 whereas ROM (read-only memory), solid-state memory devices, memory storage devices, and/or memory cards are examples of non-volatile memory 908.

As will be further appreciated by those skilled in the art, the CPU 902 executes instructions retrieved from memory 904, from computer-readable media such as computer-readable media 808 of FIG. 8, and/or other executable components in carrying out the various functions of the disclosed subject matter. The CPU 902 may be comprised of any of a number of available processors such as single-processor, multi-processor, single-core units, and multi-core units, which are well known in the art.

Further still, the illustrated computer system 900 typically also includes a network communication interface 912 for interconnecting this computing system with other devices, computers and/or services over a computer network, such as network 108 of FIG. 1. The network communication interface 912, sometimes referred to as a network interface card or NIC, communicates over a network using one or more communication protocols via a physical/tangible (e.g., wired, optical fiber, etc.) connection, a wireless connection such as Wi-Fi or Bluetooth communication protocols, NFC, or a combination thereof. As will be readily appreciated by those skilled in the art, a network communication interface, such as network communication interface 912, is typically comprised of hardware and/or firmware components (and may also include or comprise executable software components) that transmit and receive digital and/or analog signals over a transmission medium (i.e., the network 108).

The illustrated computer system 900 also includes a graphics processing unit (GPU) 914. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied in a variety of scenarios including training machine learning models such as deep neural networks, which also manipulate large amounts of data. Indeed, one or more GPUs, such as GPU 914, are often viewed as essential processing circuitry when conducting machine learning techniques. Also, and according to various embodiments, while GPUs, such as GPU 914, are often included in computer systems and available for processing convolutions of machine learning models, multiple GPUs are also often deployed on a computer system such as shown in FIG. 9, and/or as online GPU services or farms.

Also included in the computer system 900 is a query response component 300 implemented as an executable component, or as a collection of cooperative, executable components. According to aspects of the disclosed subject matter and in execution on the computer system 900, the query response component 300 causes the computer system to maintain a corpus 114 of content items that are maintained as visual content items, where at least some of the content items are associated with textual content. The query response component 300 further causes the computer system 900 to respond to a text-based query 104 from a computer user 101 with responsive content items from the corpus 114 of content items, as described above. As shown in the non-limiting example of FIG. 9, the query response component 300 includes various logical (if not actual) executable components including, by way of illustration and not limitation, a frequency matching component 302, a query expansion component 304, an interest mapping component 306, a content identification component 308, a content selection and response component 310, and a results validation component 312. Also, illustratively included as part of (or associated with) the computer system 900 is a deep neural network 600 suitably trained to generate predicted scores for an interest node of an interest taxonomy with respect to an expanded query, where the predicted score is indicative of the likelihood that the interest node is a good match for the expanded query among the nodes of the interest taxonomy 118.

As discussed above, the frequency matching component 302, in execution on the computer system 900, conducts a mapping to identify the most-engaged content item (or most-engaged content items) from the corpus 114 of content items associated with the text-based query 104. In various embodiments, this mapping is carried out by way of an indexed query/content table 320, stored in a data store 922. The indexed query/content table 320 associates text-based queries and engagements scores or counts to content items within the corpus 114 of content items. The result of the frequency matching component 302 is a set 303 of one or more most-engaged content items corresponding to the received text-based query 104.

According to aspects of the disclosed subject matter and in execution on the computer system 900, a logical query expansion component 304 generates an expanded query 305 from the received text-based query 104 and one or more text-based terms associated with the one or more most-engaged content items corresponding to the received text-based query. The result of the query expansion component 304 is an expanded query 305 that can be used to identify the most-likely interest nodes of the interest taxonomy 118. The query expansion component 304 identifies textual content associated with the content items of the set 303 of most-engaged content items corresponding to the received text-based query. This identified textual content associated with the set 303 of most-engaged content items may include, by way of illustration and not limitation, one or more of a users' annotations of the content items, content titles of the content items, captions within and/or associated with the content items, the content items file name, a source path (e.g., a uniform resource locator or "URL", or uniform resource identifier or "URI") indicating an external source location of the content items, and the like.

According to aspects of the disclosed subject matter and in execution on the computer system 900, a logical interest mapping component 306 maps the expanded query 305 to one or more interest nodes of the interest taxonomy 118. In accordance with aspects of the disclosed subject matter, the interest mapping component 306 utilizes a trained machine learning mapping model/deep neural network 600 to map expanded queries to one or more interest nodes of the interest taxonomy, resulting in a set 307 of likely interest nodes. More particularly, the interest mapping component 306, via the trained mapping model, obtains a predicted score for the interest nodes of the interest taxonomy 118 and selects one or more highest-scoring interest nodes according to the predicted scores and includes them as a set 307 of most-likely interest nodes for the expanded query 305.

According to aspects of the disclosed subject matter and in execution on the computer system 900, the content identification component 308 uses the set 307 of most-likely interest nodes to identify those content items within the corpus 114 of content items that are associated with the interest nodes of the set 307 of most-likely interest nodes. According to aspects of the disclosed subject matter, the content identification component 308 identifies a set 309 of content items that are associated with one or more of the interest nodes of the set 307 of most-likely interest nodes. In various embodiments, these identified content items are further identified according to their overall popularity to many users of the online service 110.

According to aspects of the disclosed subject matter and in execution on the computer system 900, the content selection and response component 310 selects a subset of all content items from the set 309 of content items according to their determined popularity and returns the subset of content items to the requesting user as the response content 116.

In accordance with aspects of the disclosed subject matter and in execution on the computer system 900, the results validation component 312 analyzes the subset of content items to the requesting user returned to the requesting user in view of the text-based query 104 and the expanded query 305 to determine the relevance of the query to the subset of content items. This analysis leads to updated information, used in in training the deep neural network 600 of or associated with the interest mapping component 306.

Regarding the various components of the exemplary computing device 900, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for providing a content response to a query from a user, the computer-implemented method comprising:
   receiving a text-based query from a user;
   determining a visual content item from a corpus of visual content items based at least in part on a frequency that the visual content item is included in query responses to the received text-based query from a plurality of users;
   determining at least one text-based term associated with the visual content item that is not already included in the received text-based query;
   generating an expanded query by combining the at least one text-based term associated with the visual content item with the received text-based query;
   mapping the expanded query to an interest node of an interest taxonomy;
   identifying a set of visual content items associated with the mapped interest node of the interest taxonomy;
   selecting a subset of visual content items from the set of visual content items associated with the mapped interest node of the interest taxonomy; and
   providing the subset of visual content items as a response to the received text-based query.

2. The computer-implemented method of claim 1, further comprising:
   identifying a plurality of text-based terms associated with the visual content item; and
   wherein determining the at least one text-based term associated with the visual content item that is not already included in the received text-based query comprises determining at least one text-based term from the plurality of text-based terms associated with the visual content item.

3. The computer-implemented method of claim 2, further comprising:
   selecting multiple text-based terms of the plurality of text-based terms associated with the visual content item including the at least one text-based term; and generating the expanded query by combining the multiple text-based terms associated with the visual content item with the received text-based query.

4. The computer-implemented method of claim 1, further comprising:
   determining a plurality of visual content items from the corpus of visual content items based at least in part on a second frequency that the plurality of visual content items is included in query responses to the received text-based query, including the visual content item;
   determining a plurality of text-based terms associated with the plurality of visual content items, including the at least one text-based term; and
   generating a second expanded query by combining the plurality of text-based terms associated with the plurality of visual content items with the received text-based query.

5. The computer-implemented method of claim 4, further comprising:
   mapping the second expanded query to a plurality of interest nodes of the interest taxonomy, including the interest node, using a trained mapping model; and
   identifying a second set of visual content items associated with the plurality of mapped interest nodes of the interest taxonomy.

6. The computer-implemented method of claim 5, wherein mapping the expanded query to the plurality of interest nodes of the interest taxonomy using the trained mapping model comprises:
   associating a score with interest nodes of the interest taxonomy using the trained mapping model, each score indicative of an associated interest node being a match for the expanded query; and
   identifying the plurality of interest nodes of the interest taxonomy having the highest associated scores.

7. The computer-implemented method of claim 1, wherein determining the at least one text-based term associated with the visual content item that is not already included in the received text-based query comprises:
   identifying textual content associated with the visual content item from any one or more of a user's annotations of the visual content item, a file name associated with the visual content item, and a source path indicative of a source location of an external source of the visual content item; and
   determining the at least one text-based term from the identified textual content.

8. The computer-implemented method of claim 1, wherein determining the at least one text-based term associated with the visual content item not already included in the received text-based query comprises:
   processing the visual content item by a content classifier to generate text-based classification information for the visual content item; and
   determining the at least one text-based term from the classification information generated by the content classifier.

9. A computer-readable medium bearing computer-executable instructions which, when executed on a computing system comprising at least a processor executing the instructions, carry out a method for providing a response to a text-based query, the method comprising:
   receiving a text-based query from a user;
   determining a visual content item from a corpus of visual content items based at least in part on a frequency that the visual content item is included in query responses to the received text-based query from a plurality of users;
   identifying textual content associated with the visual content item;
   determining a plurality of text-based terms from the textual content associated with the visual content item;
   generating an expanded query by combining the plurality of text-based terms associated with the visual content item with the received text-based query;
   mapping the expanded query to an interest node of an interest taxonomy;
   identifying a set of visual content items associated with the mapped interest node of the interest taxonomy;
   selecting a subset of visual content items from the set of visual content items associated with the mapped interest node of the interest taxonomy; and
   providing the subset of visual content items as a response to the received text-based query.

10. The computer-readable medium of claim 9, the method further comprising:
    mapping the expanded query to a plurality of interest nodes of the interest taxonomy, the plurality of interest nodes including the mapped interest node; and
    identifying a second set of visual content items associated with the plurality of mapped interest nodes of the interest taxonomy, including the mapped interest node.

11. The computer-readable medium of claim 10, wherein mapping the expanded query to the plurality of interest nodes of the interest taxonomy comprises:
    associating a score with interest nodes of the interest taxonomy, each score indicative of an associated interest node being a match for the expanded query; and
    identifying the plurality of interest nodes of the interest taxonomy having the highest associated scores.

12. The computer-readable medium of claim 9, the method further comprising:
    determining a plurality of visual content items from the corpus of visual content items based at least in part on a second frequency that the plurality of visual content items are included in query responses to the received text-based query;
    identifying textual content associated with the plurality of visual content items;
    determining a plurality of text-based terms associated with the plurality of visual content items from the identified textual content associated with the plurality of visual content items that are not already included in the received text-based query; and
    generating a second expanded query by combining the plurality of text-based terms associated with the plurality of visual content items with the received text-based query.

13. The computer-readable medium of claim 11, wherein:
    each score associated with the associated interest node of the interest taxonomy is a predicted score indicative of the associated interest node being a match for the expanded query; and
    the predicted scores associated with the interest nodes of the interest taxonomy are generated according to a trained deep neural network.

14. The computer-readable medium of claim 13, wherein the trained deep neural network comprises any one of a trained fastText neural network, a trained convolutional neural network (CNN), a trained recurrent neural network (RNN), a trained CNN+RNN vertical neural network, a trained CNN+RNN horizontal neural network, or a trained hierarchical attention network (HAN).

15. The computer-readable medium of claim 14, the method further comprising:
conducting an evaluation of the mapping of the expanded query to the interest node of the interest taxonomy and the content items of the response content;
retraining the trained deep neural network with the results of the evaluation; and
associating the interest node to the text-based query as a likely interest node for the text-based query.

16. The computer-readable medium of claim 9, wherein identifying textual content associated with the visual content item comprises, upon a determination that no textual content is associated with the visual content item:
classifying the visual content item using a content classifier resulting in text-based classification information; and
utilizing the text-based classification information as the textual content associated with the visual content item.

17. A computing system for responding to a text-based query from a computer user, the computing system comprising a processor and a memory, wherein the processor executes instructions stored in the memory as part of or in conjunction with additional components to respond to the text-based query, and configures the computing system to at least:
receive a text-based query from a user;
determine a visual content item from a corpus of visual content items based at least in part on a frequency that the visual content item is included in a plurality of query responses to the received text-based query from a plurality of users;
identify textual content associated with the visual content item;
determine a plurality of text-based terms from the textual content associated with the visual content item;
generate an expanded query by combining the plurality of text-based terms associated with the visual content item with the received text-based query;
map the expanded query to an interest node of an interest taxonomy using a trained mapping model;
identify a set of visual content items associated with the mapped interest node of the interest taxonomy;
select a subset of visual content items from the set of visual content items; and
provide the subset of visual content items as a response to the received text-based query.

18. The computing system of claim 17, wherein the computing system is further configured to at least:
map the expanded query to a plurality of interest nodes of the interest taxonomy using the trained mapping model, the plurality of interest nodes including the interest node; and
identify a second set of visual content items associated with the plurality of mapped interest nodes of the interest taxonomy, including the mapped interest node.

19. The computing system of claim 18, wherein in mapping the expanded query to the plurality of interest nodes of the interest taxonomy using the trained mapping model, the computer system is further configured to:
associate a score with interest nodes of the interest taxonomy using the trained mapping model, each score indicative of the associated interest node being a match for the expanded query; and
identify the plurality of interest nodes of the interest taxonomy as having the highest associated scores.

20. The computing system of claim 17, wherein in identifying textual content associated with the visual content item, upon a determination that no textual content is associated with the visual content item, the computer system is configured to:
classify the visual content item using a content classifier resulting in text-based classification information; and
utilize the text-based classification information as the textual content associated with the visual content item.

* * * * *